United States Patent [19]

Ikemizu

[11] 4,388,355
[45] Jun. 14, 1983

[54] MOLDINGS FOR VEHICLE BODY STRUCTURE

[75] Inventor: Naoyuki Ikemizu, Hiroshima, Japan

[73] Assignee: Toyo Kogyo Co., Ltd., Hiroshima, Japan

[21] Appl. No.: 365,497

[22] Filed: Apr. 5, 1982

[30] Foreign Application Priority Data

Apr. 9, 1981 [JP] Japan ............................. 56-54074

[51] Int. Cl.³ .......................................... B60R 13/02
[52] U.S. Cl. ..................................... 428/31; 52/716; 293/1; 428/120
[58] Field of Search ................ 428/31, 119, 120; 52/716, 717, 718; 293/1

[56] References Cited

U.S. PATENT DOCUMENTS 3,549,469 12/1970 Wilfert ........................... 428/119 X
4,363,839 12/1982 Watanabe et al. ..................... 428/31

FOREIGN PATENT DOCUMENTS 53-45838 11/1978 Japan ................................. 428/12
55-70344  5/1980 Japan ................................. 428/31

Primary Examiner—Henry F. Epstein
Attorney, Agent, or Firm—Burns, Doane, Swecker and Mathis

[57] ABSTRACT

A resinous molding for a vehicle body structure comprises a generally elongated body made of synthetic resin and having a cavity defined therein. The cavity extending inwardly from one surface of the elongated body and generally over the length of the molding. It also comprises a plurality of generally rectangular thin-walled flexible ribs integrally formed with the elongated body and protruding within the cavity from the bottom of the cavity with the longitudinal axis of each of the flexible ribs oriented generally widthwise of the molding. One side face of each of the flexible ribs opposite to the bottom of the cavity is adapted to be bonded to an outer surface of the vehicle body structure.

7 Claims, 8 Drawing Figures

MOLDINGS FOR VEHICLE BODY STRUCTURE

BACKGROUND OF THE INVENTION

The present invention generally relates to a vehicle body structure and, more particularly, to resinous moldings or projecting members used to decorate and/or protect the surface of a vehicle body structure such as, for example, a door, a fender or a bumper.

Most automobiles available nowadays are equipped with one or more synthetic resin molding on their side doors, rear and front fenders and/or rear and front bumpers for dual purpose of giving a pleasant and attractive appearance and protecting the painted surfaces thereof. They are available as an optional item of automobile accessaries and are usually fitted to local areas of an automobile body structure.

An example of the prior art automobile moldings is shown in FIG. 8 of the accompanying drawings in a partial perspective view. As shown in FIG. 8, the prior art molding which appears to be pertinent to the present invention comprises an elongated body A molded or shaped to have a generally U-shaped cross-section with its side edges A1 protruding transversely of the body A, and a grid structure having vertical and horizontal ribs C interlaced one another and protruding from the bottom B defined by the body A and the side edges A1. This prior art molding is of one-piece construction and is adapted to be fitted to a local area of the automobile body structure, for example, an outer panel of a side door, by the use of a bonding material.

While the prior art molding is satisfactory and effective in giving a pleasant and attractive appearance and also protecting the painted surface, it tends to fall off from the local area to which it has been fitted, because according to the prior art no means has been provided for permitting the molding to compensate for the difference in shrinkage between the molding and the material for the automobile body structure. More specifically, the respective materials for the molding and the automobile body structure are of heteregeneous quality and undergo thermal expansion and contraction under the influence of change in ambient temperature, it being, however, a truth that the extent to which one of them undergoes the thermal expansion and contraction greatly differs from that of the other material. This is due to the difference in coefficient of thermal expansion between the respective materials for the molding and the automobile body structure, and repeated thermal expansion and contraction of one of the molding and the automobile body structure relative to the other renders the bonding material to gradually loss its bonding ability.

SUMMARY OF THE INVENTION

Accordingly, the present invention has been developed with a view to substantially eliminating the foregoing shortcomings inherent in the prior art molding and has for its essential object to provide an improved molding for an automobile body structure wherein means is provided for compensating for a difference in coefficient of thermal expansion to minimize a loss of the bonding power of a bonding material used to fit the molding to a local area of the automobile body structure.

Another object of the present invention is to provide an improved molding of the type referred to above, which has a minimized, or substantially eliminated, possibility of the molding falling off from the outer panel of the automobile body structure.

In order to accomplish the foregoing and other objects, the present invention provides an improved resinous molding which comprises an elongated panel body having at least its side edge portions integral with and protruding generally transversely from the opposite sides of the panel body. The molding has a recess defined by the panel body and the side edge portions and includes a plurality of generally rectangular thin-walled flexible ribs integral with and protruding within the recess from one surface of the panel body occupying the bottom of such recess. The flexible ribs are so positioned with their longitudinal axes oriented widthwise of the molding and are adapted to be bonded to a local area of the automobile body structure by the use of a bonding material, for example, a length of double-sided adhesive tape, when the molding is to be fitted to the automobile body structure.

When in use, i.e., after the molding according to the present invention has been fitted to the automobile body structure in the manner as described above, the difference in coefficient of thermal expansion between the molding and the material forming at least the local area of the automobile body structure to which it has been fitted can be compensated for or absorbed by causing the flexible ribs, while maintaining a firmly bonded relation to the body structure, to deform or yield in a direction generally lengthwise of the molding as if in an undulating motion allowing one of the molding and the body structure to undergo a thermal expansion or contraction relative to the other.

Accordingly, not only is the possibility of the molding falling off from the local area of the body structure minimized or substantially eliminated, but also the use of the thin-walled flexible ribs permits the amount of the synthetic resin to be small as compared with that necessary to manufacture the molding of the construction shown in FIG. 8 and, therefore, permits the production of the molding in a simplified construction having a light-weight feature and at the reduced cost.

If desired, the molding according to the present invention may have at least one pair of elastic fingers adapted to be snapped into a corresponding aperture defined in the local area of the automobile body structure.

BRIEF DESCRIPTION OF THE DRAWINGS

These and other objects and features of the present invention will become apparent from the following description taken in conjunction with preferred embodiment thereof with reference to the accompanying drawings, in which.

DETAILED DESCRIPTION OF THE EMBODIMENTS

Figure 1:
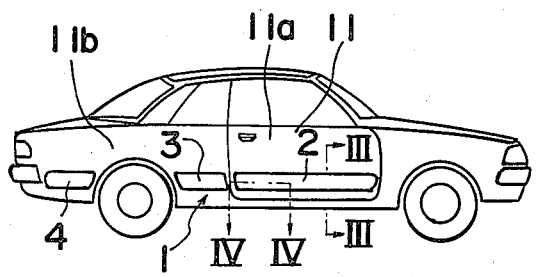
FIG. 1 is a side elevational view of an automobile showing elongated moldings of the present invention used as side protectors for decorating and protecting each side of the automobile body structure.

Before the description of the present invention proceeds, it is to be noted that like parts are designated by like reference numerals throughout the accompanying drawings.

Referring first to FIG. 1, an automobile has its side doors 11a and rear fender structure 11b provided with elongated moldings or side protectors 2, 3 and 4. The side protector 2 is secured to an outer panel 11 of each side door 11a whereas the side protectors 3 and 4 are secured to each side panel portion of the fender structure 11b on respective lateral sides of an associated rear wheel assembly and are held in line with the side protector 2 on the respective side door 11a. All of these side protectors are generally of identical construction and, therefore, only one of them, for example, the side protector 2 on each side door 11a will be described in detail for the sake of brevity.

Figure 2:
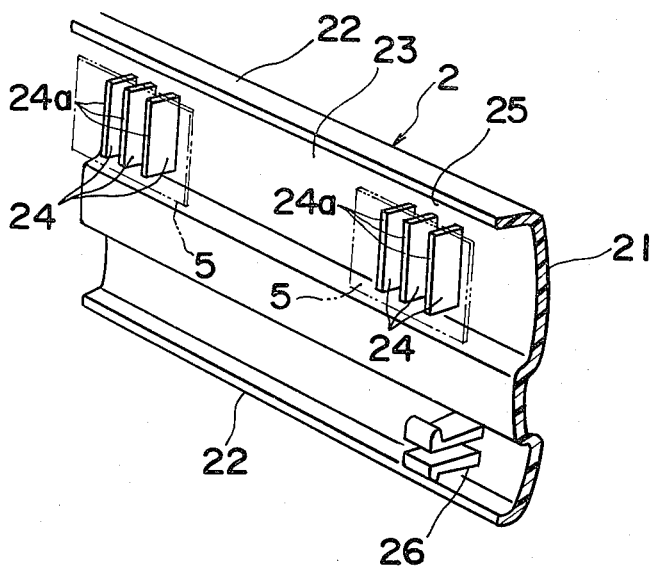
FIG. 2 is a perspective view of one of the moldings adapted to be secured to an outer panel of a side door in the body structure.
Figure 3:
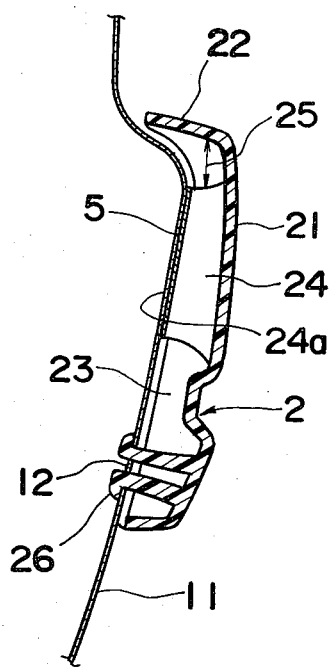
FIG. 3 is a cross-sectional view taken along the line III—III shown in FIG. 1.
Figure 4:
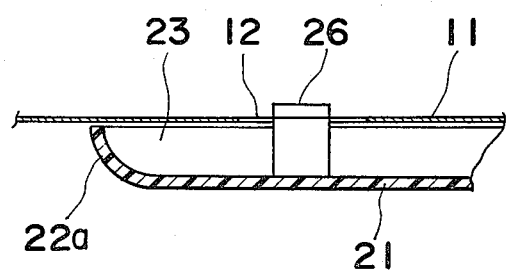
FIG. 4 is a cross-sectional view taken along the line IV—IV shown in FIG. 1.

Referring now to FIGS. 2 to 4, the side protector 2, which is an elongated molding of synthetic resin, for example, urethane, vinyl chloride, polypropylene or any other material, is of one-piece construction comprising an elongated panel body 21 having its opposite side edge portions 22 and opposite end portions 22a so curvedly bent to protrude in the same direction generally transversely of the panel body 21 as to define a generally U-sectioned recess 123. The side protector 2 also comprises a plurality of generally rectangular thin-walled flexible ribs 24 integral with and protruding within the recess 23 from one surface of the panel portion 21 occupying the bottom of the recess 23. Each of these flexible ribs 24 is so positioned that its longitudinal axis extends generally at right angles to the longitudinal axis of the side protector 2 and generally parallel to the widthwise direction of the same.

Although the flexible ribs 24 may be equally spaced from each other over the length of the side protector 2 or may be paired, the flexible ribs 24 so far shown are grouped in three trios each consisting of the three ribs 24, each adjacent two trios of the flexible ribs being spaced from each other a distance which is greater than the spacing between each adjacent two ribs 24 of the respective trio. It is to be noted that one of these trios of the flexible ribs 24 is located at a substantially intermediate portion of the panel body 21 while the other two trios are located adjacent to the opposite end portions of the panel body 21.

Except for one side of each flexible rib 24 of all of the trios being integral with the panel body 21, its opposite ends are spaced at 25 from the adjacent side edge portions 22, the opposite side of each flexible rib 24 being adapted to serve as a fitting face 24a to which a bonding material, for example, a length of double-sided adhesive tape, is to be applied as will be described later.

If desired, one or more pairs of elastic fingers 26 may be integrally formed with the panel portion 21 so as to protrude from the surface of said panel portion 21 occupying the bottom of the recess 23 and positioned at a level below the trios of the flexible ribs 24 for engagement into appropriate apertures 12 to be formed in the outer panel 11 of the side door 11a.

When it comes to the mounting of the side protector 2 of the above described construction to the outer panel 11 of the corresponding side door 11a, three pieces of double-sided adhesive tape, shown by the phantom lines 5 in FIG. 2, is applied to the fitting faces 24a of the trios of the flexible ribs 24. Thereafter, the side protector 2 is secured to the outer panel 11 by the application of an external force to allow the pieces 5 of double-sided adhesive tape to bond to the outer panel 11. Should the pair or pairs of the elastic fingers 26 are employed, they should be snapped into corresponding apertures 12, defined in the outer panel 11, simultaneously with the attachment of the side protector 2 to the outer panel 11. It is to be noted that one or each aperture 12 in the outer panel 11 should be elongated in a direction generally lengthwise of the side protector 2 a certain distance necessary to accommodate the movement of the respective pair of the fingers 26 which would take place as a result of thermal expansion or contraction of the side protector 2 relative to the outer panel 11.

Figure 5:
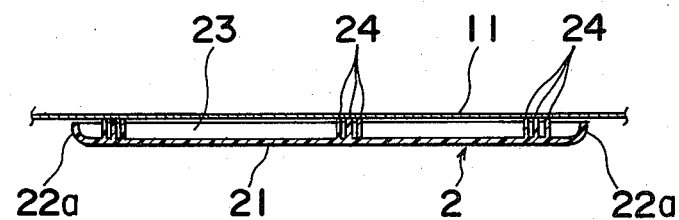
FIG. 5 is a cross-sectional view similar to FIG. 4, showing the molding secured to the side door.
Figure 6:
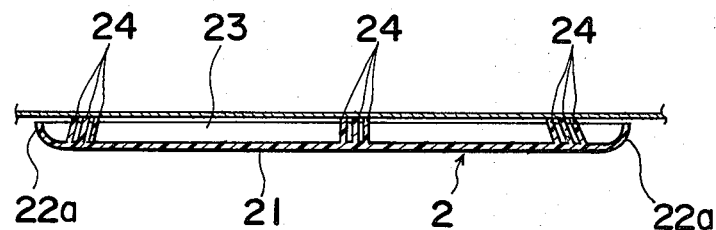
FIG. 6 is a view similar to FIG. 5, showing flexible ribs of the molding deformed upon thermal expansion or contraction of one of the molding and the side door relative to the other.

From the foregoing, it has now become clear that the side protector or elongated molding constructed according to the present invention is effective to accommodate the thermal expansion or contraction of the side protector or elongated molding relative to the automobile body structure. More specifically, referring to FIG. 5 in which the side protector 2 is shown as secured to the automobile body structure with the trios of the flexible ribs 24 bonded to the outer panel 11, the side protector 2 having a greater coefficient of thermal expansion than that of the metallic material for the outer panel 11 undergoes thermal expansion and contraction under the influence of change in ambient temperature relative to the outer panel 11. Assuming that the side protector 2 has expanded under the influence of the ambient temperature, the trios of the flexible ribs 24 bonded to the outer panel 11 by the intervention of the double-sided adhesive tapes 5 do not separate from the outer panel 11, but deform or yield to permit the side protector 2 to expand length-wise as shown in FIG. 6. This is possible because each of the thin-walled flexible ribs 24 of all of the trios is so formed on the panel body 21 with its longitudinal axis extending generally widthwise of the side protector 2 and is so spaced from any one of the side edge portions 22.

In view of the above, it is also clear that the elongated molding according to the present invention can be substantially maintained secured to the automobile body structure free from any influence the change in ambient temperature may bring thereon.

Figure 7:
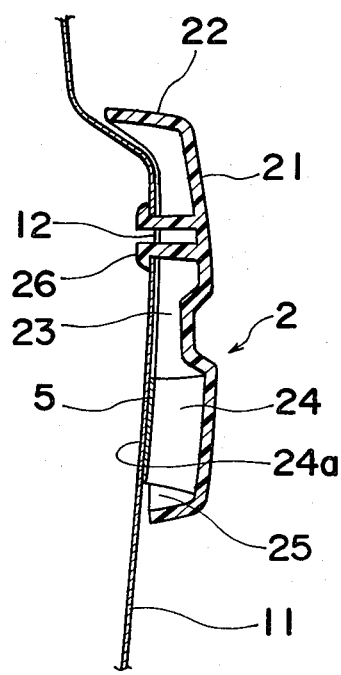
FIG. 7 is a view similar to FIG. 3, showing a modified form of the molding.
Figure 8:
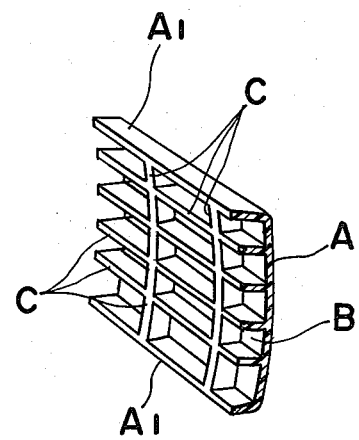
FIG. 8 is a perspective view of the prior art molding for the automobile body structure.

In the foregoing embodiment described with reference to FIGS. 2 to 4, the elastic fingers 26 have been positioned at the level below the trios of the flexible ribs 24. However, they may be reversed in position as shown in FIG. 7.

Although the present invention has fully been described in connection with the preferred embodiments thereof with reference to the accompanying drawings, it is to be noted that various changes and modifications are apparent to those skilled in the art. By way of example, although the trios of the flexible ribs 24 are shown as aligned with each other in line with the longitudinal axis of the elongated molding, they may be formed in alternately off-set relation to the longitudinal axis of the elongated molding.

Also, the elongated molding may have any suitable cross-sectional shape other than that shown, so far as each of the flexible ribs 24 can be formed with its longitudinal axis extending widthwise of the elongated molding.

Accordingly, such changes and modifications are to be understood as included within the true scope of the present invention unless they depart therefrom.

I claim:

1. A resinous molding for a vehicle body structure which comprises a generally elongated body made of synthetic resin and having a recess defined therein, said recess extending inwardly from one surface of the elongated body and generally over the length of the molding, and a plurality of generally rectangular thin-walled flexible ribs integrally formed with the elongated body and protruding within the recess from the bottom of said recess with a longitudinal axis of each of said flexible ribs oriented generally widthwise of the molding, said ribs being spaced from a peripheral side wall of the body, one face of each of the flexible ribs opposite to the bottom of the recess being adapted to be bonded to an outer surface of the vehicle body structure.

2. A molding as claimed in claim 1, wherein said elongated body is adapted to be secured to the vehicle body structure as a side protector so as to extend in parallel relation to the lengthwise direction of the vehicle body structure.

3. A molding as claimed in claim 1, wherein said flexible ribs are grouped into at least two spaced sets, the flexible ribs of each set being spaced from each other a distance smaller than the spacing between said sets of the flexible ribs.

4. A molding as claimed in claim 3, further comprising at least one pair of elastic fingers integral with the elongated body and protruding outwards from the bottom of the cavity, said pair of the elastic fingers being adapted to be snapped into an aperture, defined in the vehicle body structure at such local area, when the molding is secured thereto.

5. A molding as claimed in claim 4, wherein said aperture is a slot extending in a lengthwise direction of the elongated body.

6. A molding as claimed in claim 5, wherein the set of ribs and the pair of elastic fingers are positioned one above the other on the elongated body in a widthwise direction of the elongated body.

7. A molding as claimed in claim 3, wherein the number of sets of the ribs is three, the first and second sets of said ribs being positioned adjacent opposite end portions of the elongated body while the third set of said ribs is positioned generally intermediate the length of the elongated body.

* * * * *